(12) United States Patent
Giani et al.

(10) Patent No.: US 10,841,322 B2
(45) Date of Patent: Nov. 17, 2020

(54) DECISION SYSTEM AND METHOD FOR SEPARATING FAULTS FROM ATTACKS

(71) Applicant: General Electric Company, Schenectady, NY (US)

(72) Inventors: Annarita Giani, Niskayuna, NY (US); Masoud Abbaszadeh, Clifton Park, NY (US); Lalit Keshav Mestha, Month Colonie, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 253 days.

(21) Appl. No.: 15/958,285

(22) Filed: Apr. 20, 2018

(65) Prior Publication Data
US 2019/0222595 A1 Jul. 18, 2019

Related U.S. Application Data

(60) Provisional application No. 62/618,976, filed on Jan. 18, 2018.

(51) Int. Cl.
*H04L 29/06* (2006.01)
*G06K 9/62* (2006.01)
(Continued)

(52) U.S. Cl.
CPC ........ *H04L 63/1425* (2013.01); *G05B 19/048* (2013.01); *G06F 11/006* (2013.01);
(Continued)

(58) Field of Classification Search
CPC .. H04L 63/14; H04L 63/1415; H04L 63/1425
See application file for complete search history.

(56) References Cited

U.S. PATENT DOCUMENTS

2012/0185728 A1  7/2012  Guo et al.
2012/0329426 A1*  12/2012  Kario ............... H04W 12/12
                                                              455/410
(Continued)

FOREIGN PATENT DOCUMENTS

CN  101516099 B  12/2010
EP  3206368 A1  8/2017
EP  3239884 A1  11/2017

OTHER PUBLICATIONS

Ourston, Dirk Dr. et al., "Applications of Hidden Markov Models to Detecting Multi-Stage Network Attacks", Proceedings of the 36th Annual Hawaii International Conference on System Sciences (HICSS'03), Jan. 6-9, 2003, http://ieeexplore.ieee.org/document/1174909/, 10pgs.
(Continued)

*Primary Examiner* — Dao Q Ho
(74) *Attorney, Agent, or Firm* — Buckley, Maschoff & Talwalkar LLC

(57) ABSTRACT

According to some embodiments, a plurality of monitoring nodes may each generate a series of current monitoring node values over time that represent a current operation of the industrial asset. A node classification computer may determine, for each monitoring node, a classification result indicating whether each monitoring node is in a normal or abnormal state. A disambiguation engine may receive the classification results from the node classification computer and associate a Hidden Markov Model ("HMM") with each monitoring node. For each node in an abnormal state, the disambiguation engine may execute the HMM associated with that monitoring node to determine a disambiguation result indicating if the abnormal state is a result of an attack
(Continued)

or a fault and output a current status of each monitoring node based on the associated classification result and the disambiguation result.

15 Claims, 23 Drawing Sheets

(51) Int. Cl.
  *G06F 21/50* (2013.01)
  *G06F 11/00* (2006.01)
  *G05B 19/048* (2006.01)

(52) U.S. Cl.
  CPC .......... *G06F 21/50* (2013.01); *G06K 9/6267* (2013.01); *G06K 9/6297* (2013.01); *H04L 63/14* (2013.01); *G06F 2201/86* (2013.01)

(56) References Cited

U.S. PATENT DOCUMENTS

| | | |
|---|---|---|
| 2015/0067844 A1 | 3/2015 | Brandt et al. |
| 2017/0063898 A1 | 3/2017 | Muddu et al. |
| 2017/0230410 A1 | 8/2017 | Hassanzadeh et al. |
| 2017/0264629 A1 | 9/2017 | Wei et al. |
| 2017/0302679 A1 | 10/2017 | Caramico |
| 2017/0359366 A1 | 12/2017 | Bushey et al. |

OTHER PUBLICATIONS

Xu, Xin et al., "Defending DDoS Attacks Using Hidden Markov Models and Cooperative Reinforcement Learning", Pacific Asia Conference on Intelligence and Security Informatics, Apr. 11-12, 2007, https://dl.acm.org/citation.cfm?id=1763621, (pp. 196-207, 12 total pages).

Chen, Chia-Mei et al., "Defending Malicious Attacks in Cyber Physical Systems", IEEE 1st International Conference on Cyber-Physical Systems, Networks, and Applications, Aug. 19-20, 2013, http://ieeexplore.ieee.org/document/6614240/, (pp. 13-18, 6 total pages).

"Communication—European Search Report", EP Application No. 18204056.8, dated Apr. 18, 2019, 8 pp.

* cited by examiner

800 →

| | ABNORMAL/ UNDECIDED 802 | FAULT 804 | ATTACK 806 |
|---|---|---|---|
| ABNORMAL/ UNDECIDED | 2% | 49% | 49% |
| FAULT | 0% | 99.5% | 0.5% |
| ATTACK | 0% | 0.5% | 99.5% |

*FIG. 8*

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| RANGE 2 | >1200 | 1200-1150 | 1150-1100 | 1100-1050 | 1050-1000 | 1000-950 | 950-900 | 900-850 | 850-800 | 700-750 | 750-700 | 700-650 | 650-600 | 600-550 | 550-500 | 500-450 | 450-400 | 400-350 | 350-300 | <300 |
| ABNORMAL | .1443 | 0.0005 | 0.2655 | 0.0808 | 0 | 0 | 0 | 0 | 0 | 0 | 0 | 0 | 0 | 0 | 0 | 0 | 0 | 0 | 0 | 0.5 |
| FAULT | 0 | 0 | 0 | 0 | 0 | 0 | 0 | 0 | 0 | 0 | 0 | 0 | 0 | 0 | 0 | 0 | 0 | 0 | 0 | 1 |
| ATTACK | .4418 | .1438 | .2193 | 0.0856 | 0.0462 | 0.0189 | 0.0442 | 0 | 0 | 0 | 0 | 0 | 0 | 0 | 0 | 0 | 0 | 0 | 0 | 0 |

*FIG. 13*

| ABNORMAL/ UNDECIDED 1402 | FAULT 1404 | ATTACK 1406 |
|---|---|---|
| 100% | 0% | 0% |

| ABNORMAL/ UNDECIDED 1802 | FAULT 1 (STUCK AT 0) 1804 | FAULT 2 (INTERMITTENT) 1806 | ATTACK 1806 |
|---|---|---|---|
| 100% | 0% | 0% | 0% |

| ESTIMATED \ ACTUAL | ABNORMAL/ UNDECIDED 2102 | FAULT 1 (STUCK AT 0) 2104 | FAULT 2 (INTERMITTENT) 2106 | ATTACK 2108 |
|---|---|---|---|---|
| ABNORMAL/ UNDECIDED | 0 | 0 | 0 | 0 |
| FAULT 1 (STUCK AT 0) | 4 | 8/8 = 100% | 0 | 0 |
| FAULT 2 (INTERMITTENT) | 0 | 0 | 29/30 = 96% | 0 |
| ATTACK | 4 | 0 | 1 | 48/48 = 100% |

FIG. 21

DECISION SYSTEM AND METHOD FOR SEPARATING FAULTS FROM ATTACKS

CROSS-REFERENCE TO RELATED APPLICATION

The present application claims the benefit of U.S. Provisional Patent Application No. 62/618,976 entitled "DECISION SYSTEM AND METHOD FOR SEPARATING FAULTS FROM ATTACKS" and filed Jan. 18, 2018.

At least one embodiment described herein was made with Government support under contract number DE-OE0000833 awarded by the Department of Energy. The Government has certain rights in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect an industrial asset from cyber-attacks in an automatic and accurate manner even when attacks percolate through the IT and OT layers and directly harm control systems.

SUMMARY

According to some embodiments, a plurality of monitoring nodes may each generate a series of current monitoring node values over time that represent a current operation of the industrial asset. A node classification computer may determine, for each monitoring node, a classification result indicating whether each monitoring node is in a normal or abnormal state. A disambiguation engine may receive the classification results from the node classification computer and associate a Hidden Markov Model ("HMM") with each monitoring node. For each node in an abnormal state, the disambiguation engine may execute the HMM associated with that monitoring node to determine a disambiguation result indicating if the abnormal state is a result of an attack or a fault and output a current status of each monitoring node based on the associated classification result and the disambiguation result.

Some embodiments comprise: means for receiving, by a node classification computer, a series of current monitoring node values over time from a plurality of monitoring nodes that represent a current operation of the industrial asset; means for determining, by the node classification computer for each monitoring node, a classification result indicating whether each monitoring node is in a normal or abnormal state; means for associating, by a disambiguation engine, a Hidden Markov Model with each monitoring node; for each node in an abnormal state, means for executing the HMM associated with that monitoring node to determine a disambiguation result indicating if the abnormal state is a result of an attack or a fault; and means for outputting a current status of each monitoring node based on the associated classification result and the disambiguation result.

Some technical advantages of some embodiments disclosed herein are improved systems and methods to protect an industrial asset from cyber-attacks in an automatic and accurate manner.

BRIEF DESCRIPTION OF THE DRAWINGS

FIG. 8 shows state transition probability based on domain knowledge in accordance with some embodiments.

FIG. 13 is emission probability in the case of range 2 according to some embodiments.

FIG. 14 illustrates initial state distribution in accordance with some embodiments.

FIG. 18 is an initial state distribution in accordance with some embodiments.

FIG. 21 is disambiguation results according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
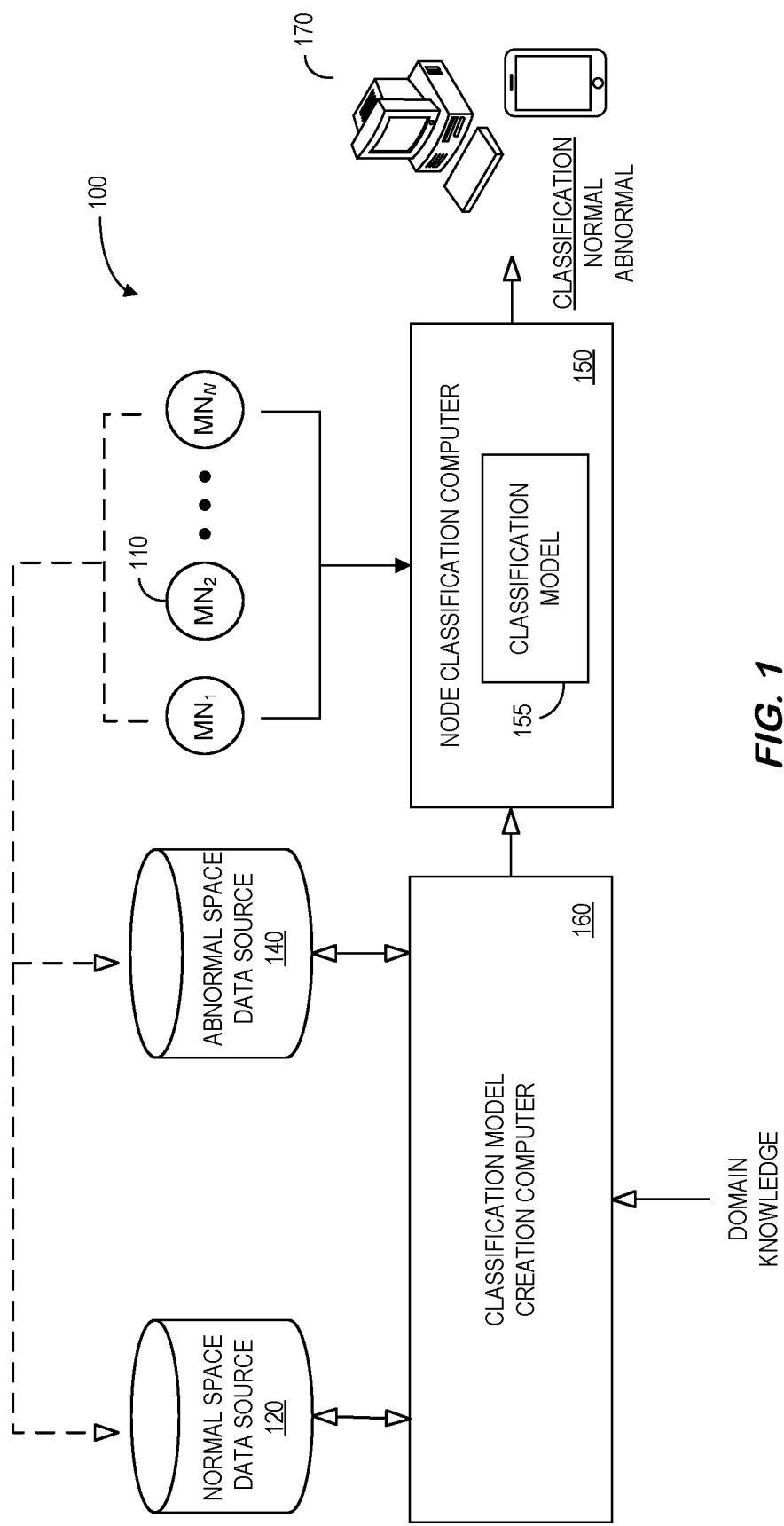
FIG. 1 is a high-level block diagram of a system that may be provided in accordance with some embodiments.

Industrial Control Systems ("ICS") that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. FIG. 1 is a high-level architecture of a system 100 in accordance with some embodiments. The system 100 may include a "normal space" data source 120 and an "abnormal space" data source 140. The normal space data source 120 might store, for each of a plurality of monitoring nodes 110, a series of normal values over time that represent normal operation of an industrial asset (e.g., generated by a model or collected from actual monitoring node 130 data as illustrated by the dashed line in FIG. 1). The abnormal space data source 140 might store, for each of the monitoring nodes 110, a series of abnormal values that represent abnormal operation of the industrial asset (e.g., when the system is experiencing a fault or cyber-attack).

Information from the normal space data source 120 and the abnormal space data source 140 may be provided to a classification model creation computer 160 that uses this data to create a decision boundary (that is, a boundary that separates normal behavior and abnormal behavior). The decision boundary may then be used by a node classification computer 150 executing a classification model 155. The classification model 155 may, for example, monitor streams of data from the monitoring nodes 110 comprising data from sensor nodes, actuator nodes, and/or any other critical monitoring nodes (e.g., monitoring nodes $MN_1$ through $MN_N$) and automatically output a classification result (e.g., indicating that operation of the industrial asset is normal or abnormal) to one or more remote monitoring devices 170 when appropriate (e.g., for display to a user) and/or to a disambiguation engine as described herein. As used herein, the term "automatically" may refer to, for example, actions that can be performed with little or no human intervention. According to some embodiments, information about detected abnormality may be transmitted back to an industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The classification model creation computer 160 may store information into and/or retrieve information from various data stores, such as the normal space data source 120 and/or the abnormal space data source 140. The various data sources may be locally stored or reside remote from the classification model creation computer 160. Although a single classification model creation computer 160 is shown in FIG. 1, any number of such devices may be included. Moreover, various devices described herein might be combined according to embodiments of the present invention. For example, in some embodiments, the classification model creation computer 160 and one or more data sources 120, 140 might comprise a single apparatus. The classification model creation computer 160 and or node classification computer 150 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage current information in accordance with any of the embodiments described herein. In some cases, an interactive graphical display interface may let a user define and/or adjust certain parameters (e.g., attack detection trigger levels) and/or provide or receive automatically generated recommendations or results from the classification model creation computer 160 and/or the node classification computer 150.

Figure 2:
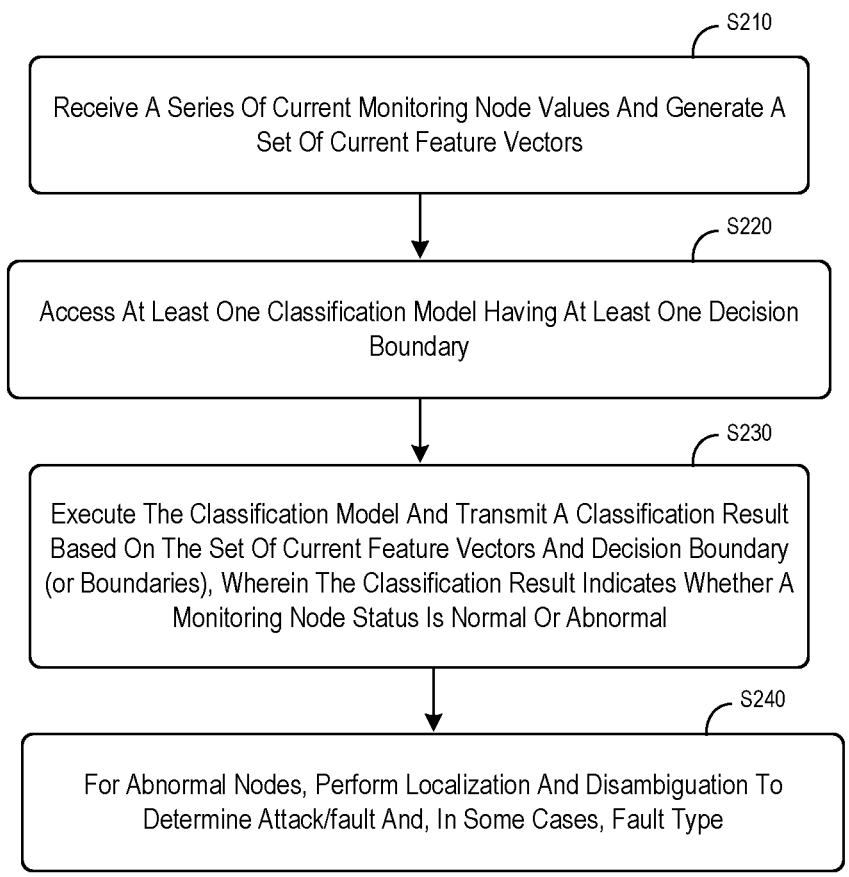
FIG. 2 is an industrial asset protection method according to some embodiments.

The decision boundary associated with the classification model can be used to detect abnormal operation of an industrial asset. For example, FIG. 2 is an industrial asset protection method according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may receive, from a plurality of monitoring nodes, a series of current values over time that represent a current operation of an industrial asset. The system may also generate, based on the received series of current values, a set of current feature vectors. At S220, a classification model may be accessed including at least one decision boundary. At S230, the model may be executed and a classification result may be transmitted based on the set of current feature vectors and the decision boundary when appropriate (e.g., when abnormal operation is detected). According to some embodiments, one or more response actions may be performed when a classification result is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, etc. At S240, the system may perform, localization (e.g., to determine which node caused the abnormal operation) and/or disambiguation (e.g., to determine if an abnormal condition is a result of a fault or a cyber-attack as described herein).

Some embodiments described herein may take advantage of the physics of a control system by learning a priori from tuned high fidelity equipment models and/or actual "on the job" data to detect single or multiple simultaneous adversarial threats to the system as well as to identify faults. Moreover, according to some embodiments, all monitoring node data may be converted to features using advanced feature-based methods, and the real-time operation of the control system may be monitoring in substantially real-time. A decision boundary may be constructed in feature space using dynamic models and may help enable early detection of vulnerabilities (and potentially avert catastrophic failures) allowing an operator to restore the control system to normal operation in a timely fashion.

Figure 3A:
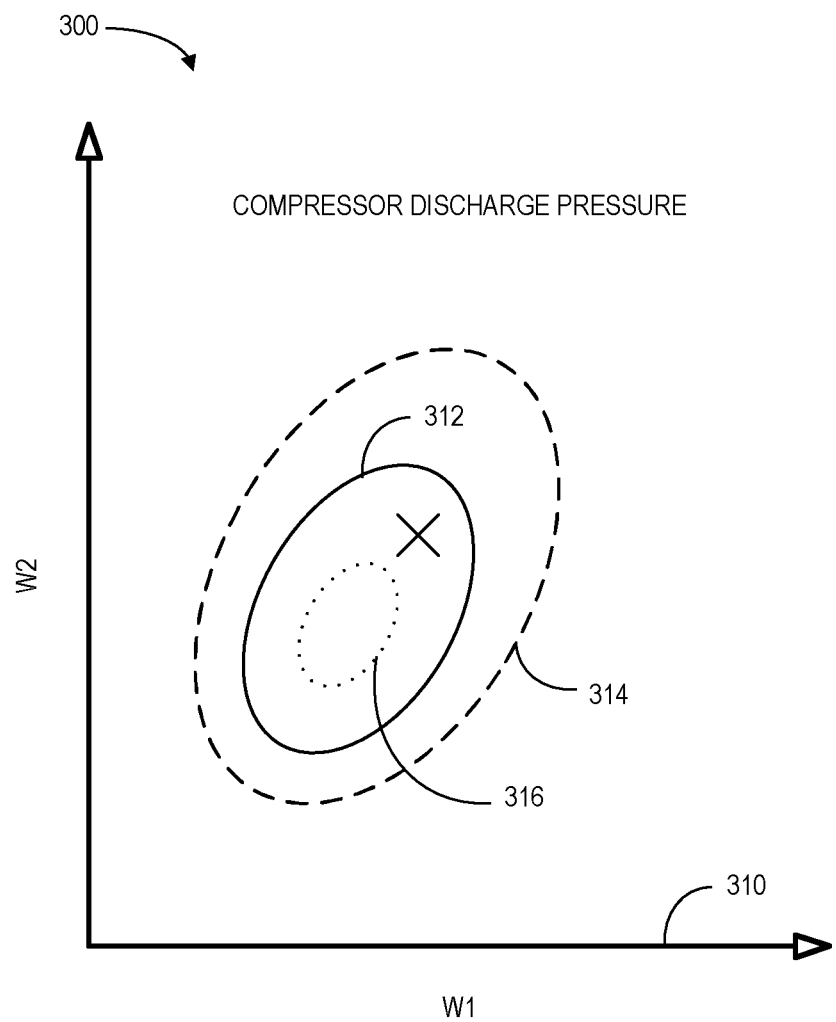
FIGS. 3A and 3B illustrate features, feature vectors, and decision boundaries in accordance with some embodiments.
Figure 3B:
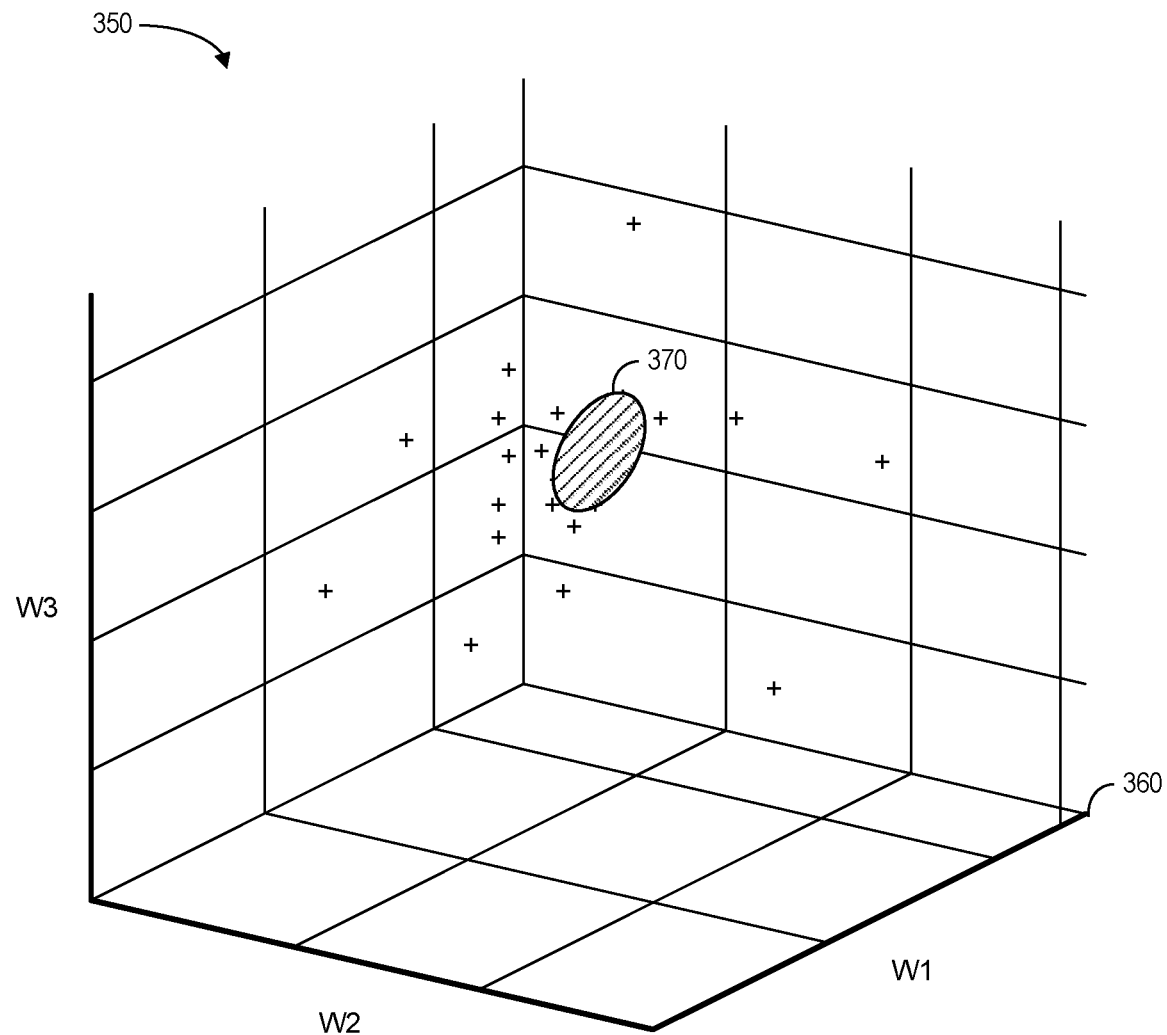

FIGS. 3A and 3B illustrate features, feature vectors, and decision boundaries in accordance with some embodiments. Note that, as used herein, the phrase "decision boundaries" and the term "classifications" may be used interchangeably and may have the same meaning. In particular, FIG. 3A illustrates 300 boundaries and feature vectors for a monitoring node parameter in accordance with some embodiments. A graph 310 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 310 illustrated in FIG. 3 represents compressor discharge temperature for a gas turbine but other values might be monitored instead (e.g., compressor pressure ratio, compressor inlet temperature, fuel flow, generator power, gas turbine exhaust temperature, etc.). The graph 310 includes an average boundary 312 (solid line), minimum boundary 314 (dotted line), and maximum boundary 316 (dashed line) and an indication associated with current feature location for the monitoring node parameter (illustrated with an "X" on the graph 310). As illustrated in FIG. 3, the current monitoring node location is between the minimum and maximum boundaries (that is, the "X" is between the dotted and dashed lines). As a result, the system may determine that the operation of the industrial asset is normal.

FIG. 3B illustrates 350 three dimensions of monitoring node outputs in accordance with some embodiments. In particular, a graph 360 plots monitoring node outputs ("+") in three dimensions, such as dimensions associated with PCA: w1, w2, and w3. Moreover, the graph 360 includes an indication of a normal operating space decision boundary 370. Although a single contiguous boundary 370 is illustrated in FIG. 3B, embodiments might be associated with multiple regions.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 4:
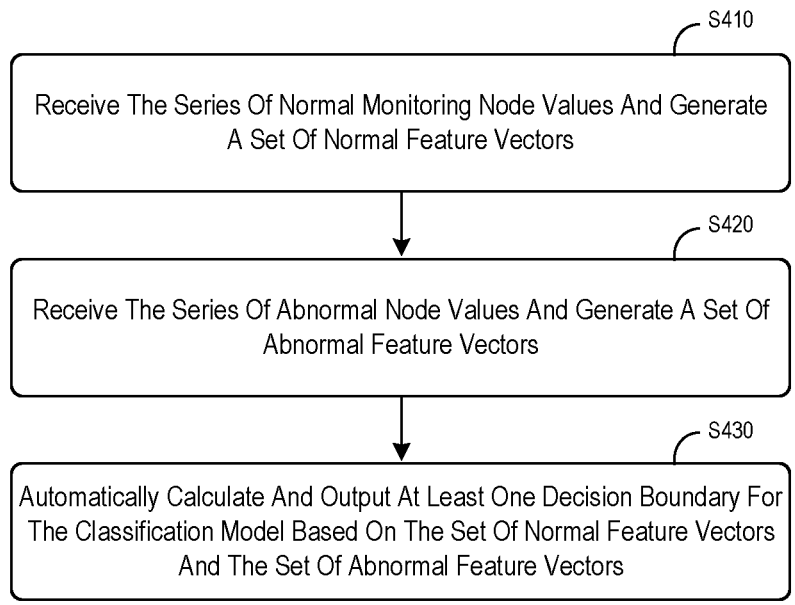
FIG. 4 is a classification model creation method according to some embodiments.

FIG. 4 illustrates a model creation method that might be performed by some or all of the elements of the system 100 described with respect to FIG. 1. At S410, the system may retrieve, for each of a plurality of monitoring nodes, a series of normal values over time that represent normal operation of the industrial asset and a set of normal feature vectors may be generated. At S420 the system may retrieve, for each of the plurality of monitoring nodes, a series of abnormal values over time that represent abnormal operation of the industrial asset and a set of abnormal feature vectors may be generated. The series of normal and/or abnormal values might be obtained, for example, by running DoE on an industrial control system associated with a power turbine, a jet engine, a locomotive, an autonomous vehicle, etc. At S430, a decision boundary may be automatically calculated and output for a classification model based on the sets of normal feature vector and abnormal feature vectors. According to some embodiments, the decision boundary might be associated with a line, a hyperplane, a non-linear boundary separating normal space from abnormal space, and/or a plurality of decision boundaries. In addition, note that the classification model might be associated with the decision boundary, feature mapping functions, and/or feature parameters.

Thus, embodiments may provide a unified system to classify the status of an industrial control system having a plurality of monitoring nodes (including sensor, actuator, and controller nodes) as being normal or abnormal. The system may be configurable and may detect both intelligent adversarial attacks and naturally occurring faults in each monitoring node. Furthermore, in case of a naturally occurring fault, some embodiments may determine a specific failure mode for each monitoring node as described herein. This may enable tailored, resilient, and fault-tolerant control remedies against cyber-attacks and faults.

Once it is established that collected data contains anomalies as compared to normal behavior, it may be important to understand the cause of such anomalies to appropriately strategize recovery methodologies. At least one embodiment described herein describes an attack vs. fault separation system and method for distinguishing cyber-attacks from naturally accruing faults. The system may include a logical decision tree acting on a plurality of monitoring nodes (i.e., system sensor, actuators, controller nodes, etc.) and a Hidden Markov Model ("HMM") acting on each individual monitoring node. Each HMM may be trained using a combination data collected from the monitoring nodes and domain knowledge, and can be adapted online. The HMM-based system described herein may also categorize the fault types per failure mode for each monitoring node.

In general, a HMM may be used to describe situations in which a hidden state emits measurements that are observable. An HMM may include a collection of hidden states, transition probabilities between states, and observation emission probabilities. This may represent, for example, the probability that a certain observable is emitted from each state. Based on these entities and an incoming sequence of measurements, it is possible to decide what is the most probable hidden state of the system. In fact, any incoming sequence of observations may be matched with the model and a decision about the state with the highest probability can be returned as an output from the model.

According to some embodiments, a goal of the system is to detect whether an attack or a fault is causing abnormal operation. As a result, the states of the model may be "fault" (and, in some cases, including different types of faults) and "attack." The system may also utilize an initial state of "abnormal/undecided." According to some embodiments, different types of faults may be identified by the system. In such embodiments, a state for each fault may be added to the model. As a result, in the simplest form a system may have only three states (categorizing all types of faults into a single fault state). In other embodiments, the system may have more granularity, such as by categorizing fault types per failure modes associated for each monitoring node. In this case, if the asset has M monitoring nodes, there may be M HMMs, each having $p_i+2$, $i=1, \ldots, M$, hidden states, where $p_i$ is the number of failure modes associated with the $i^{th}$ monitoring node.

Using training sets, the system may build signatures (probability distributions) of different measurements, given the defined states. During a detection phase (online operation) a "Viterbi algorithm" may be used to find the most likely sequence of hidden states that emits the sequence of observed measurements. As used herein, the phrase "Viterbi algorithm" may refer to a dynamic programming algorithm where a relatively large problem of path identification is divided in smaller problems.

The system may assume that the sequence of measurements that are tested has already been classified as an "abnormality" by a detection system, and localized to one or more specific monitoring nodes. Also, the localization system performs a conformance test on each monitoring node localized as "abnormal," and classifies the abnormality as being an "independent" abnormality (that is, caused by an external source) or a "dependent" abnormality (that is, caused by propagation of independent abnormalities within the system).

The attack/fault separation system works in the feature space. For each monitoring node, one or more features may be used, which could also include the current value of the node signal.

Figure 5:
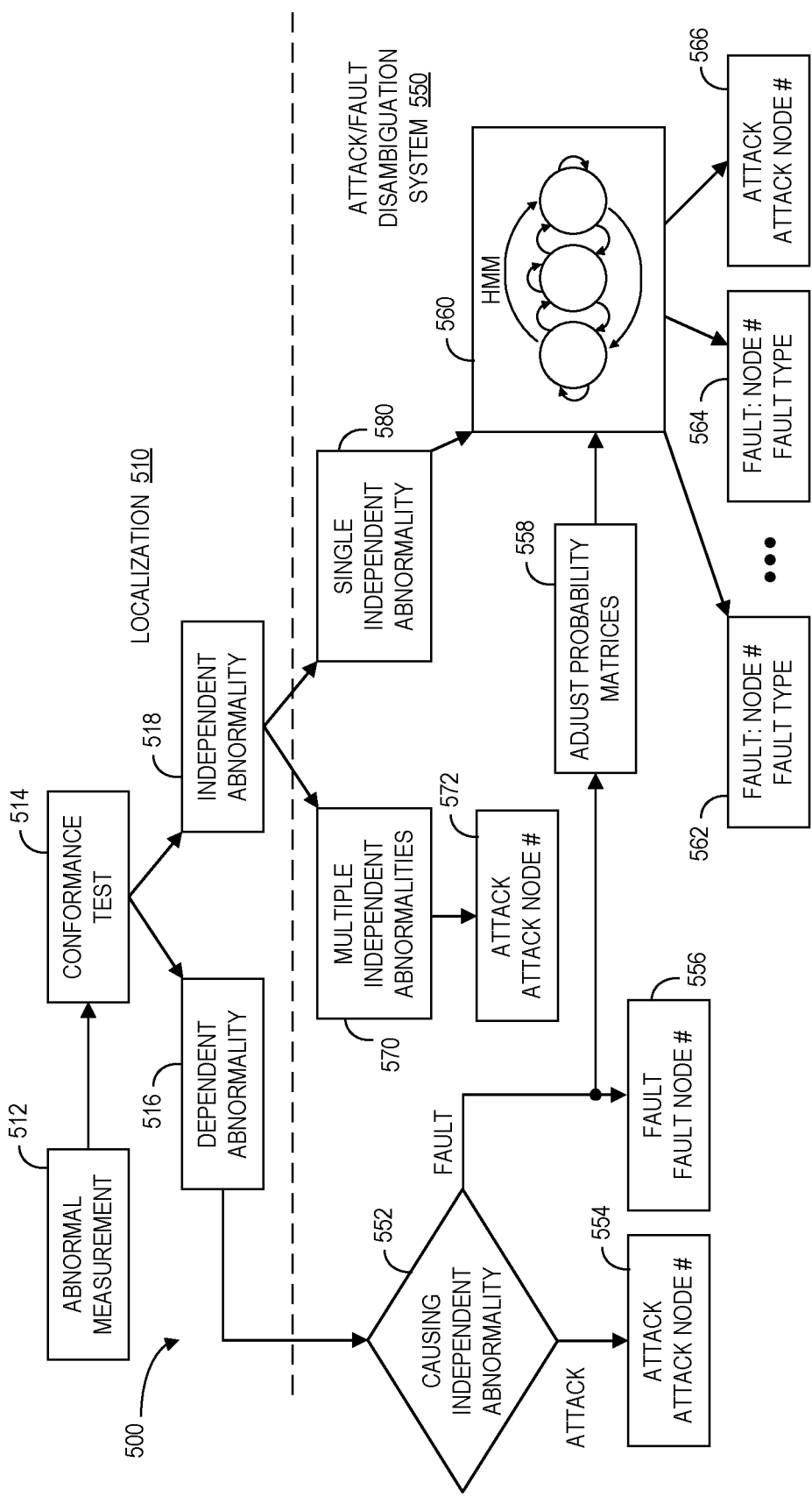
FIG. 5 is an architecture of an attack/fault disambiguation system in accordance with some embodiments.

The architecture of the attack/fault disambiguation system 500 according to some embodiments is shown in FIG. 5. The system 500 may be implemented for each monitoring node and may include both localization 510 and an attack/fault disambiguation system 550. Once an abnormality 512 is detected and localized, a conformance test S14, which is part of the localization system 510, determines whether it is an independent abnormality 518 (the cause of the abnormality originates in that monitoring node) or dependent abnormality 516 (the cause of the abnormality originates in another monitoring node and has propagated to this monitoring node). The attack/fault disambiguation system 550 may act as follows:

Multiple independent abnormalities 570: If multiple independent abnormalities 570 exist in the asset, they are categorized as a cyber-attack 572. It is known in the field of Fault Detection and Isolation ("FDI") that multiple simultaneous faults happen very rarely. Such an assumption may also be backed by field data studies (e.g., using a 10-year database of multiple gas turbines).

Single independent abnormality 580: A single independent abnormality 580 might represent either a cyber-attack or a fault. In this case, a trained HMM 560 decides the node status (and when there is a fault the system may also specify the fault type 562, 564 according to known failure modes associated with a particular monitoring node). Note that a single independent abnormality 580 might initially be categorized as a fault but later be changed into a cyber-attack 566, due to the report of another independent abnormality (or abnormalities), making it fall into the multiple independent abnormalities category 570.

Dependent abnormalities 516: If the abnormality in the monitoring node is a dependent abnormality 516 (regardless of whether other dependent abnormalities exist), the system 500 may check 552 the status of the independent abnormality from which this dependent abnormality is originated. If the cause of originating abnormality is a cyber-attack, then the dependent artifact is also categorized as an attack 554. Otherwise it is categorized as a fault S56. Furthermore, if the dependent abnormality is categorized as a fault S56, the fault type can be identified by adjusting the probability matrices 558 of the HMM 560 associated with the monitoring node. This adjustment may happen as follows:
1. A state transition matrix: The attack state is removed from the state transition matrix and the probabilities assigned to the attack state are evenly distributed to other states (i.e., the fault types).
2. An emission probability matrix: The row corresponding to the attack state is removed.

Using this adjustment S58, from the implementation perspective, two sets of state transition and emission probability matrices are pre-stored for each HMM 560, corresponding to independent or dependent abnormality (note that each HMM 560 might be trained only once).

According to some embodiments, each monitoring node is associated with its own HMM trained as follows:

A state transition matrix is initially assigned using a combination of domain knowledge and available reliability analysis for the monitoring node. This may be more effective than leaving the HMM training to the pure data-driven approaches, such as the Expectation Maximization ("EM") algorithm, since EM can be highly biased by the amount of attack data available. The HMM is initialized to an undecided state, for which a small probability is assigned. The state transition matrix may be pre-stored for each HMM. During real-time operation, the state transition matrix may be updated online. If j is the current state and i is the state at the previous time step, the elements of the matrix get updated using the following rule:

$$a_{ik}=(1-\alpha)a_{ik}+\alpha\delta_{kj}, k=1, \ldots, S$$

where α is a learning parameter in (0,1), δ is the Kronecker's delta ($\delta_{kj}$ is 1 if i=j and 0 otherwise), and S is the total number of states. The parameter α can be tuned using Maximum A Posteriori ("MAP") estimation over the training data set and pre-stored for each HMM.

An emission transition matrix may be computed by assigning a set of ranges to each feature for each monitoring node and calculating the probabilities of the feature values lying within each range. Each range may be considered as a possible emission of the HMM states. Such an approach may be both simpler and more effective than using the EM algorithm. The range bounds for each feature may be assigned by inspecting the training data sets. The probabilities may be computed as follows:
1. Single feature/time-domain value: If, for a particular monitoring node, a single feature is used (which could be the time-domain value of the node itself) then the probability for each emission for each state will be the portion of data lying within each range for that emission.
2. Multiple features: If, for a particular monitoring node, multiple features are used, then multiple matrices may be computed (one per feature) each feature having its own ranges. Then, the probability matrices may be averaged over each emission for each state and normalized such that the sum of emission probabilities for each state equals 1.

Figure 6:
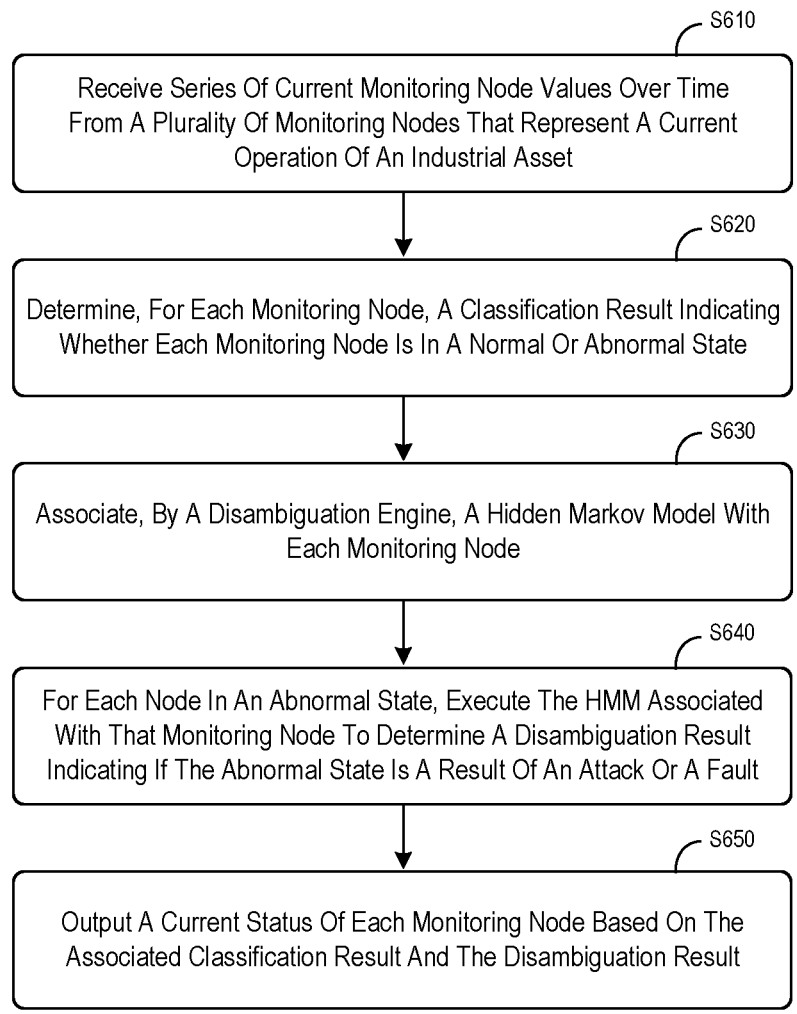
FIG. 6 is a method in accordance with some embodiments.

FIG. 6 is a method in accordance with some embodiments. At S610, a node classification computer may receive a series of current monitoring node values over time from a plurality of monitoring nodes that represent a current operation of the industrial asset. At S620, the node classification computer may determine, for each monitoring node, a classification result indicating whether each monitoring node is in a normal or abnormal state. At S630, a disambiguation engine may associate a Hidden Markov Model ("HMM") with each monitoring node. For each node in an abnormal state, at S640 the HMM associated with that monitoring node is executed to determine a disambiguation result indicating if the abnormal state is a result of an attack or a fault. A current status of each monitoring node, based on the associated classification result and the disambiguation result, may then be output at S650.

In this way, some embodiments may provide a novel solution for the challenging problem of automatic attack/fault separation without using any IT/OT layer information (such as network traffic, intrusions detection status, etc.). Some embodiments may use Markov decision processes based on real time observations that distinguish anomalies that are caused by faults from anomalies that are caused by malicious cyber-attacks. Some approaches may use fault and attack data set as inputs during HMM training.

Some advantages associated with embodiments described herein include: the automatic tuning of the parameters; a range based identification of emission probability matrix observations, and feature based identification. Note that the transition portability matrix may be set based on domain knowledge and reliability statistics of the monitoring nodes (instead of being computed solely from simulation data sets).

Consider, for example, a gas turbine that generates a sequence of anomalous measurements from a gas turbine exhaust temperature (TTXM) sensor as the result of a fault or a cyber-attack. Other sensors that might be considered include a generator output sensor (DWATT), a fuel flow sensor (FQG), a compressor inlet temperature sensor (CTIM), a compressor discharge temperature sensor (CTD), etc. For training purposes, the system may consider both fault and attack data. Attack data might be created, for example, using DoE methodology where multiple sensors were attacked and the effect spread to others. In some embodiments, the system may consider only single independent attacks. By way of example, a fault to be considered is a TTXM valve stuck at zero.

Figure 7:
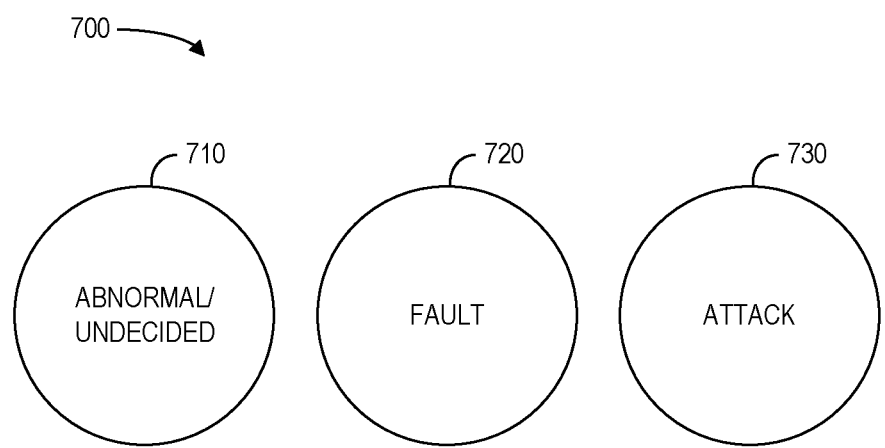
FIG. 7 illustrates system hidden states according to some embodiments.

FIG. 7 illustrates 700 system hidden states. In particular, an "abnormal/undecided" state 710 may include a mix of attacks and faults. In this example, there are two versions of abnormal/undecided. In the first version 8, runs are a combination of 4 faults runs and 4 attack runs. In the second version, each run of the 8 runs are constructed combining half of attack and half of fault run.

To create the HMM, system states 710, 720, 730 are defined along with state transition probability, an observation emission matrix, and an initial state distribution. The hidden states of the system are the states to be eventually resolved by a disambiguation process: "fault" 720 or "attack" 730. The initial state of "abnormal/undecided" 710 is introduced to start the system.

Figure 9:
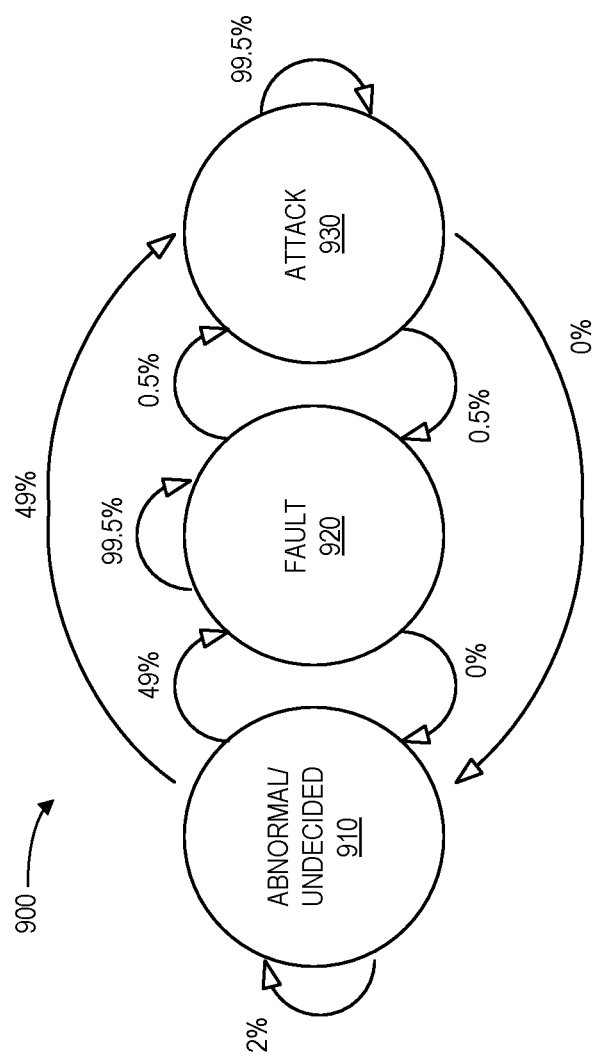
FIG. 9 is a graph view of state transition probability based on domain knowledge according to some embodiments.

The state transition probability from state "a" to state "b" describes the probability of being in a state "b" given the fact that previously the system was in state "a." This matrix can be constructed using previous data that can be verified and/or be based on domain knowledge. FIG. 8 show the transition matrix 800 for abnormal/undecided 802, fault 804, and attack 806 probabilities. These values are reflected in the transition graph 900 of FIG. 9.

Figure 10:
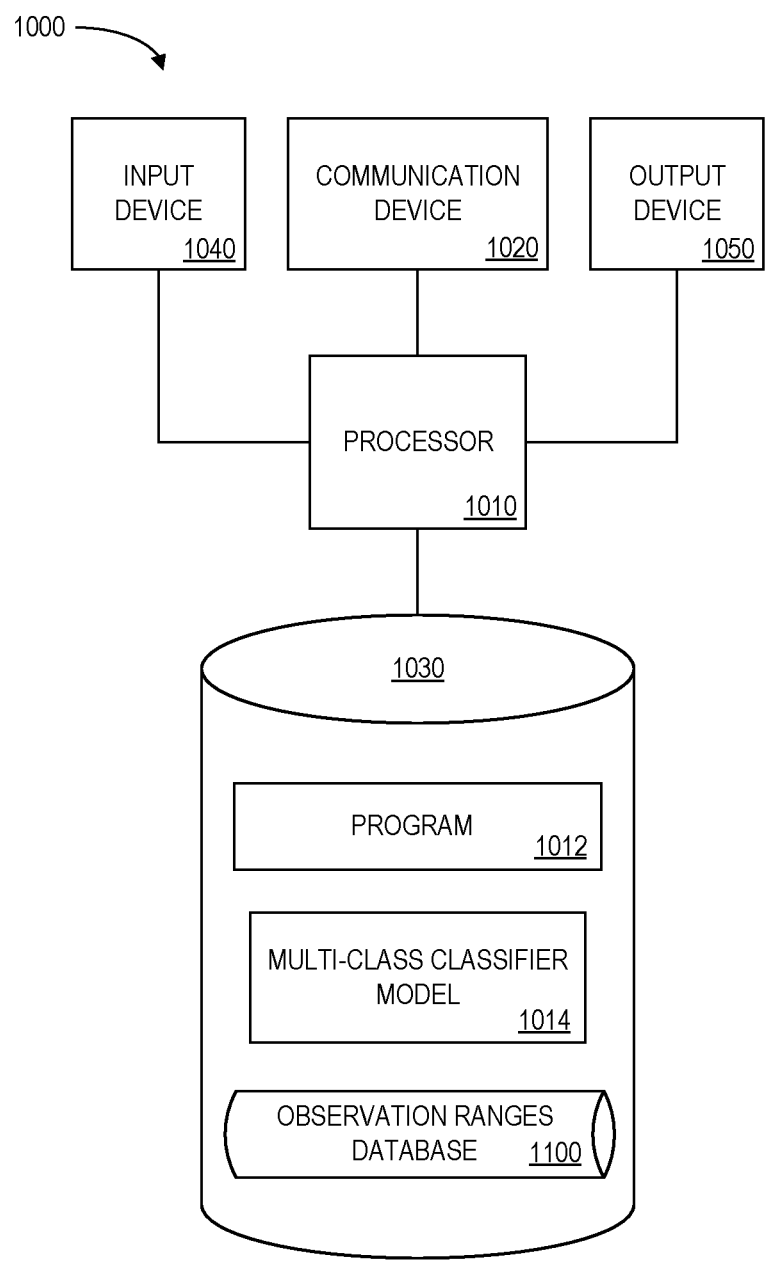
FIG. 10 is a block diagram of an industrial asset protection platform according to some embodiments of the present invention.

To determine an emission matrix, the system may use a training data set and calculate the probability that observations are emitted at each state. Note that measurements may be continuous, and to transform the continuous measurements into discrete observations, ranges of measurements may be considered. The embodiments described herein may be implemented using any number of different hardware configurations. For example, FIG. 10 is a block diagram of an industrial asset protection platform 1000 that may be, for example, associated with the systems 100, 500 of FIGS. 1 and 5, respectively. The industrial asset protection platform 1000 comprises a processor 1010, such as one or more commercially available Central Processing Units ("CPUs") in the form of one-chip microprocessors, coupled to a communication device 1060 configured to communicate via a communication network (not shown in FIG. 10). The communication device 1060 may be used to communicate, for example, with one or more remote monitoring nodes, user platforms, digital twins, etc. The industrial asset protection platform 1000 further includes an input device 1040 (e.g., a computer mouse and/or keyboard to input adaptive and/or predictive modeling information) and/an output device 1050 (e.g., a computer monitor to render a display, provide alerts, transmit recommendations, and/or create reports). According to some embodiments, a mobile device, monitoring physical system, and/or PC may be used to exchange information with the industrial asset protection platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1016 and/or a classification model 1014 for controlling the processor 1010. The processor 1010 performs instructions of the programs 1016, 1014, and thereby operates in accordance with any of the embodiments described herein. For example, the processor 1010 may create and execute a HMM model as described herein.

The programs 1016, 1014 may be stored in a compressed, uncompiled and/or encrypted format. The programs 1016, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the industrial asset protection platform 1000 from another device; or (ii) a software application or module within the industrial asset protection platform 1000 from another software application, module, or any other source.

In some embodiments (such as the one shown in FIG. 10), the storage device 1030 further stores an observation ranges database 1100. An example of a database that may be used in connection with the industrial asset protection platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 illustrates an observation ranges database in accordance with some embodiments.

Referring to FIG. 11, a table is shown that represents the observation ranges database 1100 that may be stored at the industrial asset protection platform 1000 according to some embodiments. The table may include, for example, entries identifying ranges of values for a set of twenty observations. In particular, the example of FIG. 11 illustrates two different types of range sets labeled "Range 1" and "Range 2." The first approach, "Range 1," is not uniform (e.g., observation 9 is from 1133° Fahrenheit ("F) to 1135° F. while observation 10 is from 1115° F. to 1133° F.). The second approach, "Range 2," is uniform and divides measurements for each observation into equal blocks of 50° F.

Figure 12:
FIG. 12 is emission probability in the case of range 1 in accordance with some embodiments.

To compute an emission probability matrix, the system may compute, for each state the probability of having measurements in each block. For example, FIG. 12 illustrates an emission probability matrix 1200 for "Range 1" while FIG. 13 illustrates an emission probability matrix 1300 for "Range 2." An initial state distribution 1400 is shown in FIG. 14. In particular, 100% are initially assigned to an abnormal/undecided state 1402 and none are initially assigned to a fault state 1404 or an attack state 1406.

Figure 15:
FIG. 15 is disambiguation results for range 1 according to some embodiments.
Figure 16:
FIG. 16 is disambiguation results for range 2 in accordance with some embodiments.

Once the system builds the system states, the state transition probabilities, the observation emission matrix, and the initial state distribution, a new sequence of observations may be matched to the model to determine the most probable state of the system. The results are in the table 1500 of FIG. 15 and table 1600 of FIG. 16. Note that in this example, the system identified the exact state of the system that emitted a certain sequence of observations.

Figure 17:
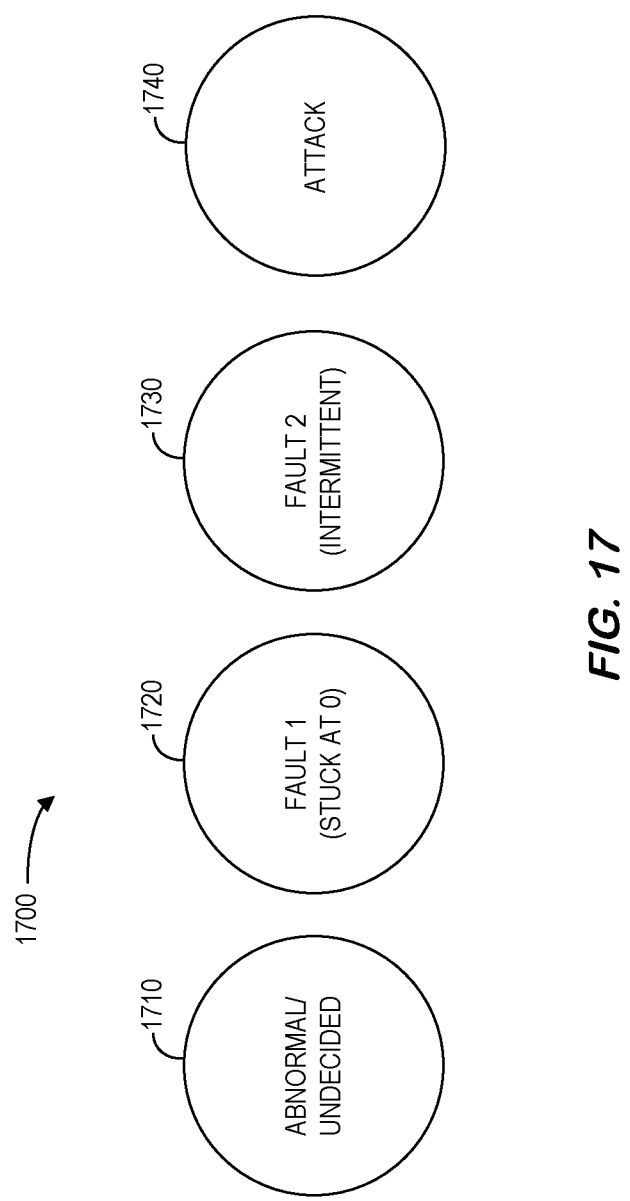
FIG. 17 illustrates states of a hidden Markov model according to some embodiments.
Figure 19:
FIG. 19 is a state transition matrix according to some embodiments.
Figure 20:
FIG. 20 is an emission probability matrix in accordance with some embodiments.

In addition to resolving an abnormal condition into a "fault" or "attack," a disambiguation engine may resolve a fault into a particular type of fault. For example, FIG. 17 illustrates a system 1700 have an abnormal/undecided state 1710, a first fault type 1720 (e.g., such at 0), a second fault type 1730 (e.g., an intermittent sensor stuck at a high value), and an attack state 1740. In this example, three intervals of around 50 seconds at 1240° F. were randomly inserted in normal runs sensor measurements of about 5 minutes. The initial distribution 1800 is presented in FIG. 18. In particular, 100% are assigned to an abnormal/undecided state 1802 and none to a first type of fault state 1804, a second type of fault state 1806, or an attack state 1808. The state transition matrix 1900 is shown in FIG. 19 for the abnormal/undecided fault state 1902, the first type of fault state 1904, the second type of fault state 1906, and the attack state 1908. Using the methods previously described to disambiguate the measurements, the system generates the emission transition matrices 2000 as shown in FIG. 20. As illustrated 2100 in FIG. 21, the results are promising with improved separation of attack and fault types.

Figure 22:
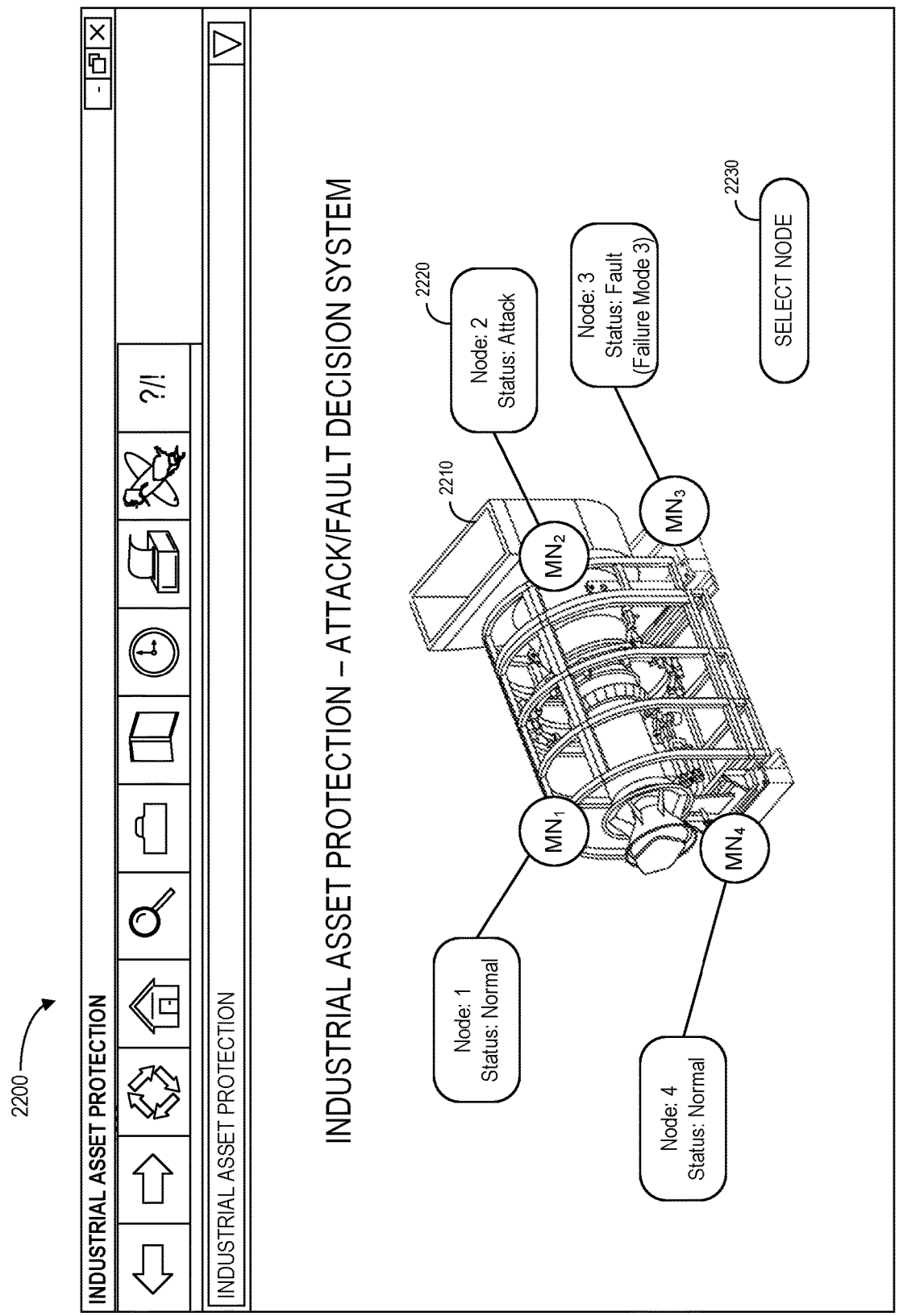
FIG. 22 is a decision system display in accordance with some embodiments.

FIG. 22 is a decision system display 2200 in accordance with some embodiments. The display 2200 includes information about an industrial asset 2210 having a number of monitoring nodes ($MN_1$ through $MN_4$). In particular, the display 2200 includes, for each node, an indication of a current status 2220, including fault and attacks states as determined by any of the disambiguation engine embodiments described herein. According to some embodiments, the display 2200 is interactive and may be used by an operator to determine more detailed information (e.g., via selection of an icon 2230) and/or to adjust the operation of the system.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on specific types of industrial assets, any of the embodiments described herein could be applied to other types of assets, such as dams, the power grid, military devices, etc.

The present invention has been described in terms of several embodiments solely for the purpose of illustration. Persons skilled in the art will recognize from this description that the invention is not limited to the embodiments described, but may be practiced with modifications and alterations.

The invention claimed is:

1. A system to protect an industrial asset, comprising:
a plurality of monitoring nodes each generating a series of current monitoring node values over time that represent a current operation of the industrial asset;
a node classification computer, coupled to the plurality of monitoring nodes, to:
 determine, for each monitoring node, a classification result indicating whether each monitoring node is in a normal or abnormal state, and
 output the classification results;
 execute a conformance test to determine if an abnormality is an independent abnormality or a dependent abnormality; and
a disambiguation engine, coupled to the node classification computer, to:
 receive the classification results from the node classification computer,
 assign a Hidden Markov Model ("HMM") to each monitoring node, for each node in an abnormal state:

execute the HMM assigned to that monitoring node to determine a disambiguation result indicating if the abnormal state is a result of an attack or a fault, further comprising:
  in the case of the independent abnormality:
    determine the independent abnormality is a single independent abnormality in a case that there are no other detected independent abnormalities, and execute the HMM assigned to that monitoring node to determine if the abnormal state is a result of an attack or a fault;
    determine the independent abnormality is a multiple independent abnormality in a case of multiple instances of independent abnormalities, and if the independent abnormality is the multiple independent abnormality, determine that the abnormal state is a result of an attack;
  in the case of the dependent abnormality associated with an originating monitoring node:
    in the case of an originating monitoring node associated with an attack, determine that the dependent abnormality is a result of an attack, and
    in the case of an originating monitoring node associated with a fault, determine that the dependent abnormality is a result of a fault and adjusting at least one of a HMM state transition matrix and a HMM emission probability matrix; and
  output a current status of each monitoring node based on the associated classification result and the disambiguation result.

2. The system of claim 1, wherein at least one HMM further determines a type of fault associated with an abnormal state.

3. The system of claim 1, wherein each HMM receives a series of observations associated with the series of current monitoring node values over time that represent a current operation of the industrial asset.

4. The system of claim 3, wherein each observation is associated with one of: (i) a fixed range of values, and (ii) variable ranges of values.

5. The system of claim 1, wherein at least one HMM is initially trained to create a state transition matrix using data collected from the monitoring nodes and domain knowledge.

6. The system of claim 5, wherein the state transition matrix is updated during operation of the industrial asset.

7. The system of claim 6, wherein elements of the state transition matrix are updated using:

$$a_{ik} = (1-\alpha)a_{ik} + \alpha\delta_{kj}, k=1, \ldots, S$$

where $\alpha$ is a learning parameter in (0,1), $\delta$ is the Kronecker's delta ($\delta_{kj}$ is 1 if i=j and 0 otherwise), S is the total number of states and the parameter a is using maximum a posteriori estimation.

8. The system of claim 1, wherein the node classification computer determines the classification result by:
  receiving the series of current monitoring node values and generate a set of current feature vectors,
  accessing at least one classification model having at least one decision boundary, and
  executing the at least one classification model and transmitting the classification result based on the set of current feature vectors and the at least one decision boundary.

9. The system of claim 8, wherein at least one monitoring node is associated with at least one of: (i) a sensor node, (ii) a critical sensor node, (iii) an actuator node, (iv) a controller node, and (v) a key software node.

10. The system of claim 8, wherein the set of current feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

11. The system of claim 8, wherein the at least one decision boundary is associated with at least one of: (i) a line, (ii) a hyperplane, and (iii) a non-linear boundary.

12. The system of claim 8, further comprising:
  a normal space data source storing, for each of the plurality of monitoring nodes, a series of normal monitoring node values over time that represent normal operation of the industrial asset;
  an abnormal space data source storing, for each of the plurality of monitoring nodes, a series of abnormal monitoring node values over time that represent abnormal operation of the industrial asset; and
  a classification model creation computer, coupled to the normal space data source and the abnormal space data source, to:
    receive the series of normal monitoring node values and generate a set of normal feature vectors,
    receive the series of abnormal monitoring node values and generate a set of attacked feature vectors, and
    automatically calculate and output the at least one decision boundary for the classification model based on the set of normal feature vectors, the set of attacked feature vectors, and the set of faulty feature vectors.

13. The system of claim 12, wherein at least one of the normal, attacked, and faulty monitoring node values are obtained by running design of experiments on an industrial control system associated with at least one of: (i) a turbine, (ii) a gas turbine, (iii) a wind turbine, (iv) an engine, (v) a jet engine, (vi) a locomotive engine, (vii) a refinery, (viii) a power grid, (ix) a dam, and (x) an autonomous vehicle.

14. A computerized method to protect an industrial asset, comprising:
  generating, for a plurality of monitoring nodes each, a series of current monitoring node values over time that represent a current operation of the industrial asset;
  determining, by a node classification computer for each monitoring node, a classification result indicating whether each monitoring node is in a normal or abnormal state;
  outputting the classification results;
  executing a conformance test to determine if an abnormality is an independent abnormality or a dependent abnormality; and
  receiving, by a disambiguation engine, the classification results from the node classification computer;
  assigning a Hidden Markov Model ("HMM") to each monitoring node, for each node in an abnormal state:
    executing the HMM assigned to that monitoring node to determine a disambiguation result indicating if the abnormal state is a result of an attack or a fault, further comprising:
      in the case of the independent abnormality:
        determining the independent abnormality is a single independent abnormality in a case that there are no other detected independent abnormalities, and executing the HMM assigned to that monitoring node to determine if the abnormal state is a result of an attack or a fault;

determining the independent abnormality is a multiple independent abnormality in a case of multiple instances of independent abnormalities, and if the independent abnormality is the multiple independent abnormality, determine that the abnormal state is a result of an attack;

in the case of the dependent abnormality associated with an originating monitoring node:

in the case of an originating monitoring node associated with an attack, determining that the dependent abnormality is a result of an attack, and in the case of an originating monitoring node associated with a fault, determining that the dependent abnormality is a result of a fault and adjusting at least one of a HMM state transition matrix and a HMM emission probability matrix; and outputting a current status of each monitoring node based on the associated classification result and the disambiguation result.

15. A non-transitory computer-readable medium storing instructions that, when executed by a computer processor, cause the computer processor to perform a method to protect an industrial asset, the method comprising:

generating, for a plurality of monitoring nodes each, a series of current monitoring node values over time that represent a current operation of the industrial asset;

determining, by a node classification computer for each monitoring node, a classification result indicating whether each monitoring node is in a normal or abnormal state;

outputting the classification results;

executing a conformance test to determine if an abnormality is an independent abnormality or a dependent abnormality; and receiving, by a disambiguation engine, the classification results from the node classification computer;

assigning a Hidden Markov Model ("HMM") to each monitoring node, for each node in an abnormal state:

executing the HMM assigned to that monitoring node to determine a disambiguation result indicating if the abnormal state is a result of an attack or a fault, further comprising:

in the case of the independent abnormality:

determining the independent abnormality is a single independent abnormality in a case that there are no other detected independent abnormalities, and executing the HMM assigned to that monitoring node to determine if the abnormal state is a result of an attack or a fault;

determining the independent abnormality is a multiple independent abnormality in a case of multiple instances of independent abnormalities, and if the independent abnormality is the multiple independent abnormality, determine that the abnormal state is a result of an attack;

in the case of the dependent abnormality associated with an originating monitoring node:

in the case of an originating monitoring node associated with an attack, determining that the dependent abnormality is a result of an attack, and in the case of an originating monitoring node associated with a fault, determining that the dependent abnormality is a result of a fault and adjusting at least one of a HMM state transition matrix and a HMM emission probability matrix; and outputting a current status of each monitoring node based on the associated classification result and the disambiguation result.

* * * * *